United States Patent
Wong (10) Patent No.: US 10,330,988 B2
(45) Date of Patent: Jun. 25, 2019

(54) LIGHT MODULATING BACKPLANE WITH MULTI-LAYERED PIXEL ELECTRODES

(71) Applicant: Chun Chiu Daniel Wong, Palo Alto, CA (US)

(72) Inventor: Chun Chiu Daniel Wong, Palo Alto, CA (US)

(73) Assignee: Syndiant, Inc., Dallas, TX (US)

( * ) Notice: Subject to any disclaimer, the term of this patent is extended or adjusted under 35 U.S.C. 154(b) by 414 days.

(21) Appl. No.: 14/960,135

(22) Filed: Dec. 4, 2015

(65) Prior Publication Data

US 2017/0160599 A1    Jun. 8, 2017

(51) Int. Cl.
*G02F 1/133* (2006.01)
*G02F 1/1343* (2006.01)

(52) U.S. Cl.
CPC .... *G02F 1/134309* (2013.01); *G02F 1/13306* (2013.01); *G02F 1/13439* (2013.01)

(58) Field of Classification Search
CPC ........... G02F 1/134309; G02F 1/13306; G02F 1/13439
See application file for complete search history.

(56) References Cited

U.S. PATENT DOCUMENTS

| | | | | |
|---|---|---|---|---|
| 5,986,729 | A * | 11/1999 | Yamanaka | G02F 1/1333 349/153 |
| 6,274,887 | B1 * | 8/2001 | Yamazaki | H01L 27/12 257/204 |
| 2001/0004251 | A1 * | 6/2001 | Kurematsu | G02F 1/133526 345/88 |
| 2001/0007488 | A1 * | 7/2001 | Sawada | G02B 5/201 349/106 |
| 2008/0150434 | A1 * | 6/2008 | Sung | H01L 27/1214 315/169.3 |
| 2016/0018703 | A1 * | 1/2016 | Wang | G02F 1/13439 257/72 |

* cited by examiner

*Primary Examiner* — Lucy P Chien
(74) *Attorney, Agent, or Firm* — Edward S. Mao (57) ABSTRACT

A light modulating Backplane with multi-layer pixel electrodes is disclosed. The light modulating backplane includes a multiple pixel control circuits and multiple pixel electrodes. The pixel electrodes include a first pixel electrode layer coupled to a corresponding pixel control circuit and a second pixel electrode layer. A passivation layer covers the pixel electrodes. The first pixel electrode layer is formed using a first metal such as copper and the second pixel electrode layer is formed using a second metal such as aluminum.

19 Claims, 8 Drawing Sheets

LIGHT MODULATING BACKPLANE WITH MULTI-LAYERED PIXEL ELECTRODES

BACKGROUND OF THE INVENTION

Field of the Invention

The present invention relates to display technology. More specifically, the present invention relates to digital backplanes that control light modulating elements, spatial light modulators and light sources.

Discussion of Related Art

Micro-displays typically include light modulating backplane and a light modulating unit or a light emitting unit. Light modulating units include such technologies as liquid crystal on silicon (LCOS) and digital micro mirrors devices (DMD). Light emitting units include technologies such as Organic light emitting diodes (OLED). The technology used in such micro displays can also be used to make larger display units.

Figure 1A:
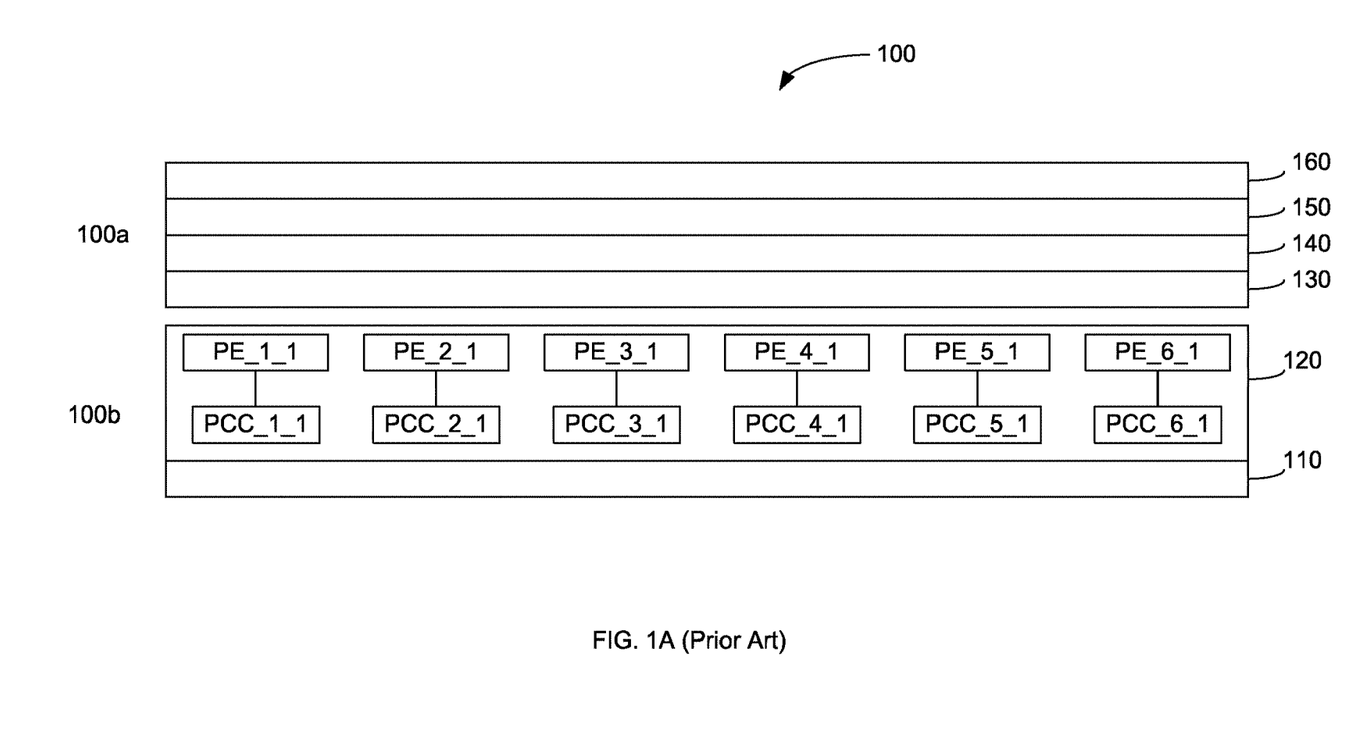
FIGS. 1A-1B illustrate a portion of a conventional LCOS display.
Figure 1B:
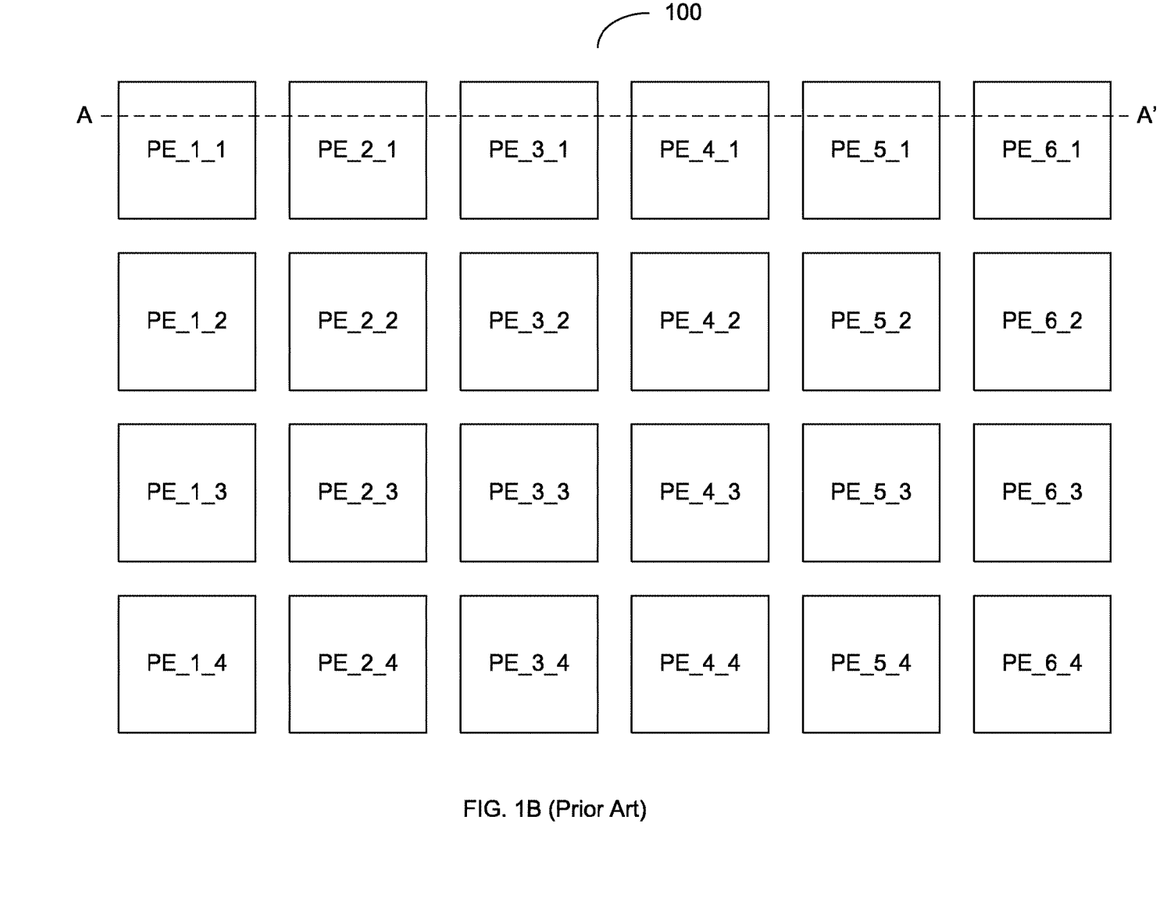

FIGS. 1A and 1B illustrate a small portion of a conventional LCOS display 100. Specifically, FIG. 1B only shows 24 pixels of LCOS display 100. Generally, a LCOS display would have thousands of pixels. FIG. 1A is a cross sectional view of display 100 along the A A' cut shown in FIG. 1B. FIG. 1B shows only one layer of LCOS display 100. Specifically, FIG. 1B shows the top of the reflective pixel electrodes of LCOS display 100.

In FIG. 1A, a substrate 110 supports the active backplane region 120 which includes pixel control circuits PCC_1_1, PCC_2_1, PCC_3_1, PCC_4_1, PCC_5_1, and PCC_6_1 and pixel electrodes PE_1_1, PE_2_1, PE_3_1, PE_4_1, PE_5_1, and PE_6_1. The pixel electrodes are located above the pixel control circuits. Each pixel electrode PE_X_Y is coupled to and controlled by pixel control circuit PCC_X_Y. Thus, pixel electrode PE_1_1 is coupled to and controlled by pixel control circuit PCC_1_1. Similarly, electrodes PE_2_1, PE_3_1, PE_4_1, PE_5_1, and PE_6_1 are coupled to and controlled by pixel control circuits PCC_2_1, PCC_3_1, PCC_4_1, PCC_5_1, and PCC_6_1, respectively. For LCOS display 100, the pixel electrodes are made of a reflective conductor to reflect incoming light as explained below. As shown in FIG. 1B, the polarized electrodes are arranged in a rectangular matrix. For clarity the pixel electrodes are PE_X_Y, where X refers to the column location of the pixel electrode and Y refers to the row location of the pixel electrode.

Active backplane region 120 also includes various, logic circuits to support the operation of the pixel control circuits. For clarity these logic circuits are omitted in the Figures because the omitted logic circuits, which are well known in the art, are not an integral aspect of the present invention. Substrate 110, the pixel control circuits, the pixel electrodes and the omitted logic circuits form a light modulating backplane 100b. In addition, a transparent passivation layer (not shown in FIGS. 1A and 1B) covers the pixel electrodes. An example of a light modulating backplane is described in U.S. Pat. No. 7,071,908, entitled "Digital Backplane" by Guttag et al., which is included herein by reference. Another example of a light modulating backplane is described in U.S. Pat. No. 8,605,015 entitled "Spatial Light Modulator with Masking Comparators" by Guttag et al., which is incorporated herein by reference.

The light modulating unit 100a of LCOS display 100 includes a liquid crystal layer 130, an alignment layer 140, a transparent common electrode layer 150, and a protective glass layer 160. Protective glass layer 160 protects the rest of LCOS display 100 but typically does not manipulate incoming or reflected light. Transparent common electrode layer 150 works with the pixel electrodes to manipulate the liquid crystals in liquid crystal layer 130. Alignment layer 140 aligns the liquid crystals in liquid crystal layer 130 to properly manipulate incoming and reflected light. Liquid crystal layer 130 contains liquid crystals that are controlled by the pixel electrodes to selectively pass incoming polarized light through liquid crystal layer 130. Specifically, when a pixel electrode is charged to an "active state" by the corresponding pixel control circuit polarized light can pass through the area of liquid crystal layer 130 above the pixel electrode and be reflected back by the pixel electrode. However, if the pixel electrode is in an inactive state polarized light is blocked in the area of liquid crystal layer 130 above the pixel electrode. Pulse width modulation is used to create different contrast levels. For color displays, color filters can be included in the light modulating unit or field sequential color schemes (i.e. rapidly cycling through three different colored light sources) can be used.

Figure 2:
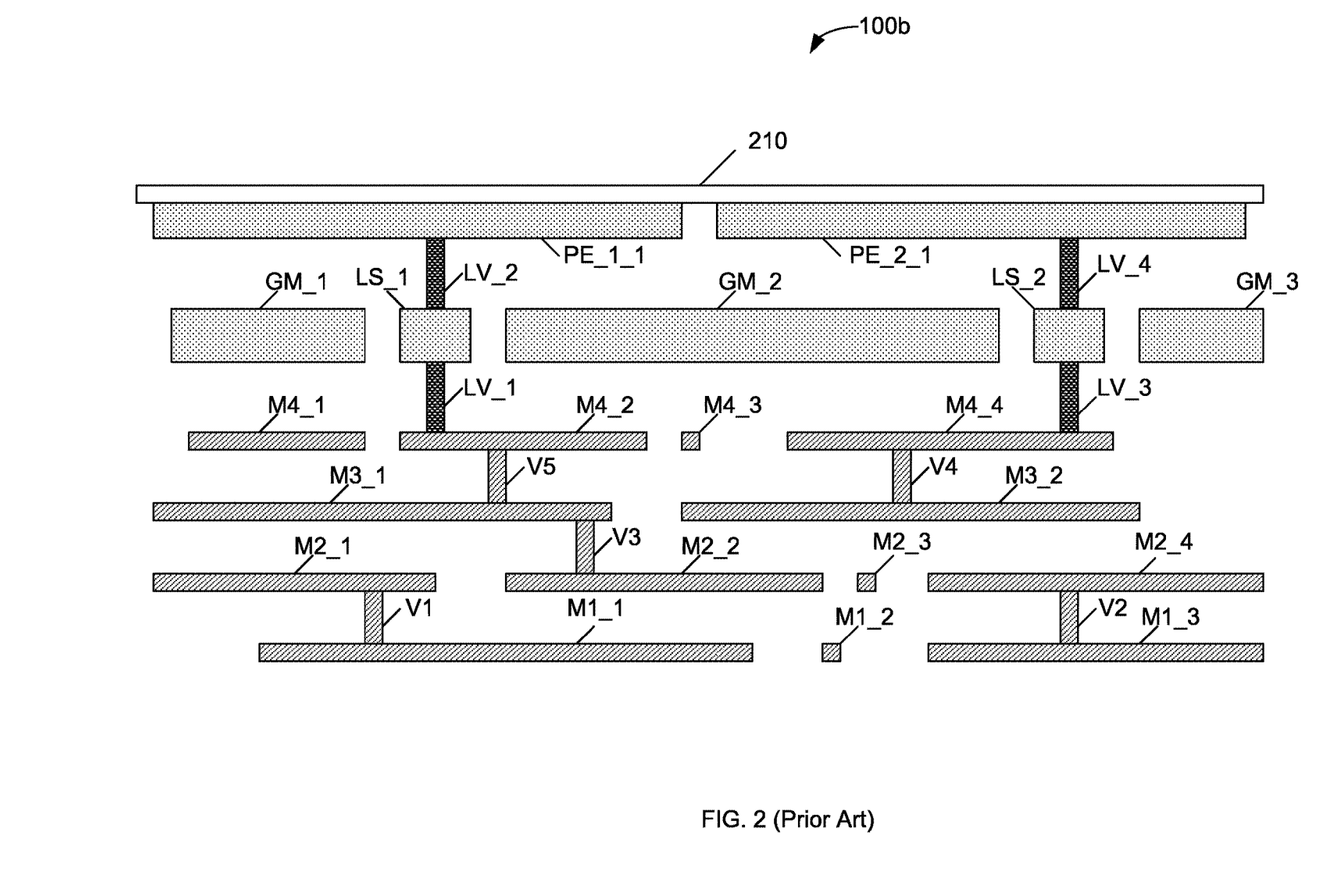
FIG. 2 is an illustration of a portion of a light modulating backplane in accordance with one embodiment of the present invention.

The light modulating backplane of conventional LCOS displays are made using a LCOS process on top of structures made with standard CMOS process. Specifically, the pixel control circuits (and supporting circuits) are made using standard CMOS process while the pixel electrodes are made using the LCOS process. FIG. 2 is a cross sectional view of display 100 along the A A' cut shown in FIG. 1B. However FIG. 2 only shows the portion of the A A' cut that includes pixel electrodes PE_1_1 and PE_1_2. FIG. 2 shows a very simplified diagram of the various metal layers in a portion active backplane region 120 of light modulating backplane 100b of LCOS display 100. Specifically for light modulating backplane 100b, 4 metal layers (typically named M1-M4) are used in the CMOS process. However other backplanes can use more or fewer metal layers. In general advanced CMOS processes use copper for the metal layers. In addition a global metal layer (named GM), is used for signals used across the entire display such as power lines, ground lines, and clock lines. In general global metal layer GM is very thick (e.g. 700 to 1300 nanometers) and is made using an additional aluminum layer for light modulating backplanes. An LCOS process is used to fabricate the pixel electrodes and the connection between the pixel electrodes and the metal layers of the pixel control circuits, which were made with the CMOS process. Aluminum is used in conventional LCOS displays for the pixel electrodes.

In FIG. 2, the various conductors and vias only illustrate the relative locations of the metal layers and do not actually form working circuits. Many details and various processing layer, which are well known in the art are omitted for clarity. For additional clarity, aluminum conductors are drawn with light shading, copper conductors are drawn with medium shading, tungsten conductors (vias) are drawn with dark shading, and transparent layers are drawn with no shading. Metal layer M1 includes copper conductor M1_1, M1_2, and M1_3. Copper conductor M1_2 is orthogonal to copper conductors M1_1 and M1_3 and thus appears very short as compared to copper conductors M1_1 and M1_3. Metal layer M2 includes copper conductor M2_1, M2_2, M2_3, and M2_4. Copper conductor M2_1 is coupled to copper conductor M1_1 by a via V1. Copper conductor M2_4 is coupled to copper conductor M1_3 by a via V2.

Metal layer M3 includes copper conductor M3_1 and M3_2. Copper Conductor M3_1 is coupled to copper conductor M2_2 by a via V3. Metal layer M4 includes copper conductor M4_1, M4_2, M4_3, and M4_4. Copper conductor M4_2 is coupled to copper conductor M3_1 by a via V5. Copper conductor M4_4 is coupled to copper conductor M3_2 by a via V4.

Metal conductors M4_2 is also coupled to pixel electrode PE_1_1 by a LCOS via LV_1, a LCOS Stud LS_1, which is formed from the global metal layer, and a LCOS via LV_2. Specifically, LCOS via LV_1 couples copper conductor M4_2 to LCOS stud LS_1, which is part of global metal layer GM. LCOS via LV_2 couples LCOS stud LS_1 to pixel electrode PE_1_1. Because copper electrodes M4_2, M3_1, and M2_2 are coupled to pixel electrode PE_1_1, copper electrodes M4_2, M3_1, and M2_2 are components of pixel control circuit PCC_1_1 (See FIG. 1A).

Metal conductors M4_4 is coupled to pixel electrode PE_2_1 by a LCOS via LV_3, a LCOS Stud LS_2, and a LCOS via LV_4. Specifically, LCOS via LV3 couples copper conductor M4_4 to LCOS stud LS_2, which is part of global metal layer GM. LCOS via LV4 couples LCOS stud LS_2 to pixel electrode PE_2_1. Because copper electrodes M4_4 and M3_2 are coupled to pixel electrode PE_2_1, copper electrodes M4_4 and M3_2 are components of pixel control circuit PCC_2_1 (See FIG. 1A). Global metal layer also includes aluminum conductors GM_1, GM_2 and GM_3.

As stated above, pixel electrodes PE_1_1 and PE_2_1 are formed with aluminum for among other reasons, the high reflectivity of aluminum and the stability of aluminum. In LCOS displays the global metal layer GM can be made using either copper or Aluminum. In LCOS display 100, global metal layer GM is an aluminum layer. LCOS vias LV_1, LV_2, LV_3, and LV_4 are made using tungsten, which can provide good electrical contacts with both copper and aluminum. A transparent passivation layer 210 covers the top of the light modulating backplane. In a light modulating backplane in accordance with one embodiment of the present invention, the pixel electrodes have a thickness of 260 nanometers, a width of 6.2 μm and a length of 6.2 μm. The transparent passivation layer is silicon dioxide with a thickness of 75 nanometers, Global metal layer GM has a thickness between 700 and 1300 nanometers, and metal layers M1-M4 have a thickness between 70 and 500 nanometers.

Very few microchip fabrication plants (hereinafter fabs or fab) are configured to manufacture the light modulating backplane of a LCOS display primarily due to the difficulties and additional costs of connecting the aluminum pixel electrodes to the copper metal layers of the active backplane region. Thus these few fabs can charge excessive prices to manufacture the light modulating backplanes of LCOS displays. Hence there is a need for a light modulating backplane of a LCOS display that can be manufactured using CMOS processes.

SUMMARY

Accordingly, the present invention provides a novel light modulating backplane having a multiple pixel control circuits and a multiple pixel electrodes. The pixel electrodes, which are multi-layered, include a first pixel electrode layer and a second pixel electrode layer. The first pixel electrode layer is coupled to a corresponding pixel control circuit. Generally, the first pixel electrode layer is formed using a first metal and the second pixel electrode layer is formed using a second metal. In a specific embodiment of the present invention the first metal is copper and the second metal is aluminum. Furthermore, in many embodiments of the present invention the pixel electrodes include a third pixel electrode layer between the first pixel electrode layer and the second pixel electrode layer. For example, in one embodiment of the present invention the third pixel electrode layer is an adhesion layer formed using titanium.

Some embodiments of the present invention are fabricated using two separate fabs. For example in some embodiments of the present invention, the first pixel electrode layer is formed at a first fab while the second pixel electrode layer is formed at a second fab. For some embodiments a protective layer is formed over the first pixel electrode layer at the first fab. The protective layer is stripped at the second fab prior to forming the second pixel electrode layer.

The present invention will be more fully understood in view of the following description and drawings.

DETAILED DESCRIPTION

As explained above, only a few fabs can manufacture conventional light modulating backplanes for LCOS displays. However light modulating backplanes in accordance with embodiments of the present invention can be manufactured using standard CMOS processes and thus can be manufactured by most CMOS fabs, which can greatly reduce the cost of making LCOS displays using the present invention.

Figure 3:
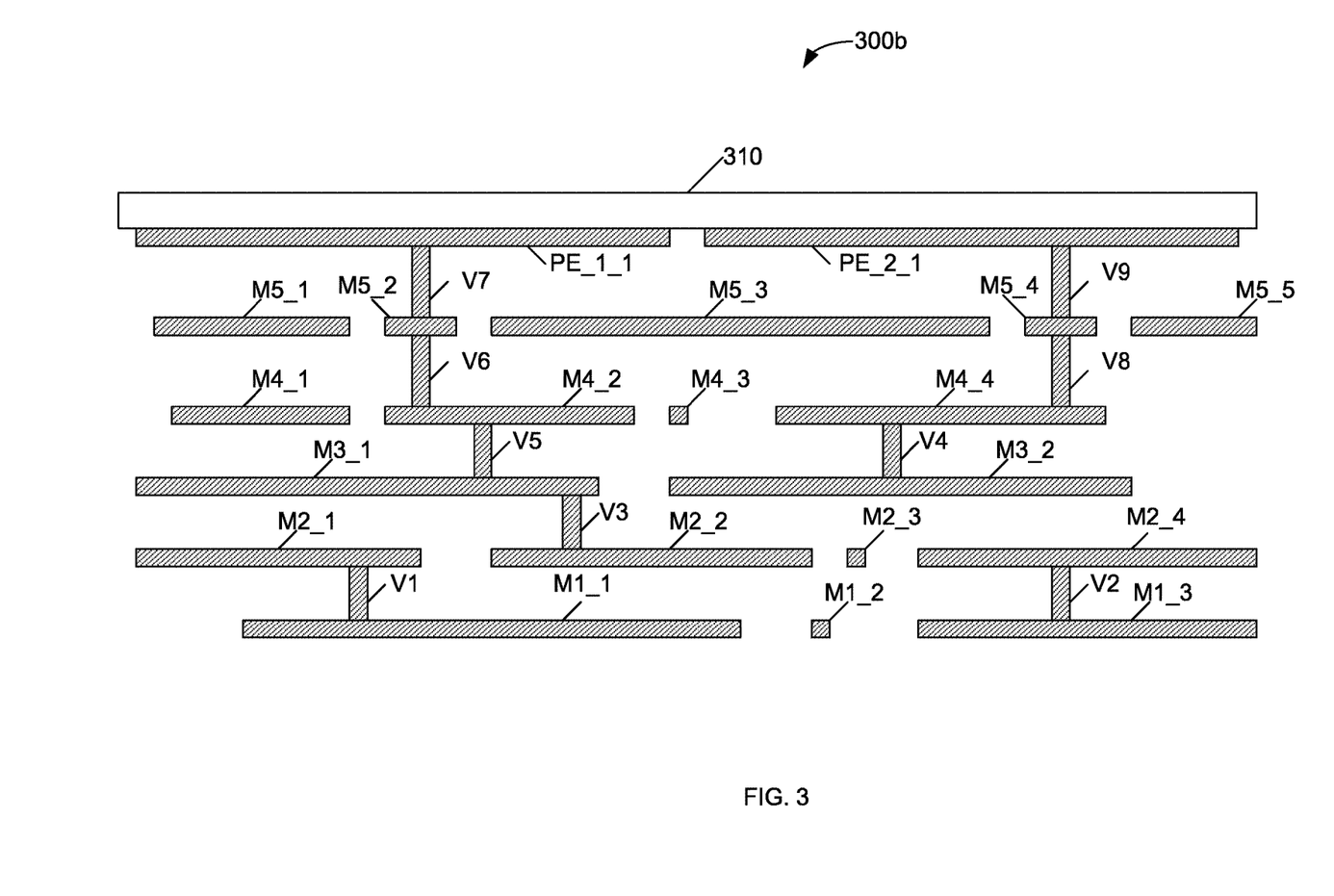
FIG. 3 is an illustration of a portion of a light modulating backplane in accordance with one embodiment of the present invention.

FIG. 3 is a cross sectional view of a light modulating backplane 300b of a display 300. Display 300 is similar to display 100 (FIGS. 1A and 1B), except the LCOS process used to manufacture the light modulating backplane of display 100 are not needed to manufacture the light modulating backplane 300b of display 300. For clarity, FIG. 3 only shows the same portion of the light modulating backplane as the portion shown in FIG. 2 of light modulating backplane 100b of LCOS display 100, (i.e. pixel electrodes PE_1_1 and PE_1_2).

Specifically, light modulating backplane 300b of LCOS display 300 uses six copper metal layers (typically named M1-M6). As in FIG. 2, the various conductors and vias of FIG. 3 only illustrate the relative locations of the metal layers and do not actually form working circuits. Many details and various processing layer, which are well known in the art are omitted for clarity. Metal layer M1 includes copper conductor M1_1, M1_2, and M1_3. Copper conductor M1_2 is orthogonal to copper conductors M1_1 and M1_3 and thus appears very short as compared to copper conductors M1_1 and M1_3. Metal layer M2 includes copper conductor M2_1, M2_2, M2_3, and M2_4. Copper conductor M2_1 is coupled to copper conductor M1_1 by a via V1. Copper conductor M2_4 is coupled to copper conductor M1_3 by a via V2.

Metal layer M3 includes copper conductor M3_1 and M3_2. Copper Conductor M3_1 is coupled to copper conductor M2_2 by a via V3. Metal layer M4 includes copper conductor M4_1, M4_2, M4_3, and M4_4. Copper conductor M4_2 is coupled to copper conductor M3_1 by a via V5. Copper conductor M4_4 is coupled to copper conductor M3_2 by a via V4.

Metal conductors M4_2 is also coupled to copper pixel electrode PE_1_1, which is part of metal layer M6 by a via V6, a copper conductor M5_2, and a via V7. Specifically, via V6 couples copper conductor M4_2 to copper conductor M5_2, which is part of metal layer M5. Via V6 couples copper conductor M5_2 to pixel electrode PE_1_1. Because copper electrodes M4_2, M3_1, and M2_2 are coupled to pixel electrode PE_1_1, copper electrodes M4_2, M3_1, and M2_2 are components of a pixel control circuit PCC_1_1 that controls pixel electrode PE_1_1.

Metal conductors M4_4 is coupled to a copper pixel electrode PE_2_1 by a via V8, a copper conductor M5_4, and a via V9. Specifically, via V8 couples copper conductor M4_4 to metal conductor M5_4, which is part of metal layer M5. Via V9 couples copper electrode M5_4 to pixel electrode PE_2_1. Because copper electrodes M4_4 and M3_2 are coupled to pixel electrode PE_2_1, copper electrodes M4_4 and M3_2 are components of a pixel control circuit PCC_2_1 which controls pixel electrode PE_2_1. Metal Layer M5_1, which is used in place of Global Metal Layer GM (of FIG. 2) also includes copper conductors M5_1, M5_3, and M5_5. In light modulating backplane 300b, metal layer M6 is used for the pixel electrodes of which pixel electrodes PE_1_1 and PE_2_1 are shown in FIG. 3.

By using copper for the pixel electrodes, special LCOS processing steps to form aluminum electrodes and LCOS vias (using Tungsten) are eliminated in the fabrication of light modulating backplane 300b. Therefore, light modulating backplane 300b can be manufactured by most CMOS fabs rather than the just the few fabs that are used for conventional LCOS displays.

However, copper electrodes have some disadvantages as compared to Aluminum electrodes for LCOS displays. For example, the reflectivity of Copper is less than the reflectivity of aluminum. Accordingly, the brightness of a display using light modulating backplane 300b may be lower than conventional LCOS display using the same light sources. Furthermore, Copper has an outdiffussion issue as compared with aluminum. Therefore, passivation layer 310 on light modulating backplane 300b must be thicker than passivation layer 210 of light modulating backplane 100b. A thicker passivation layer may further reduce the brightness of a display using light modulating backplane 300b. In addition, copper would need additional compensation for white balance as compared to aluminum.

In a particular embodiment of the present invention, the pixel electrodes have a thickness between 200 and 400 nanometers, a width of 5 micrometers and a length of 5 micrometers. Passivation layer 310 is silicon dioxide with a thickness between 20 and 100 nanometers. Metal layers M1-M6 have a thickness between 70 and 500 nanometers.

Figure 4:
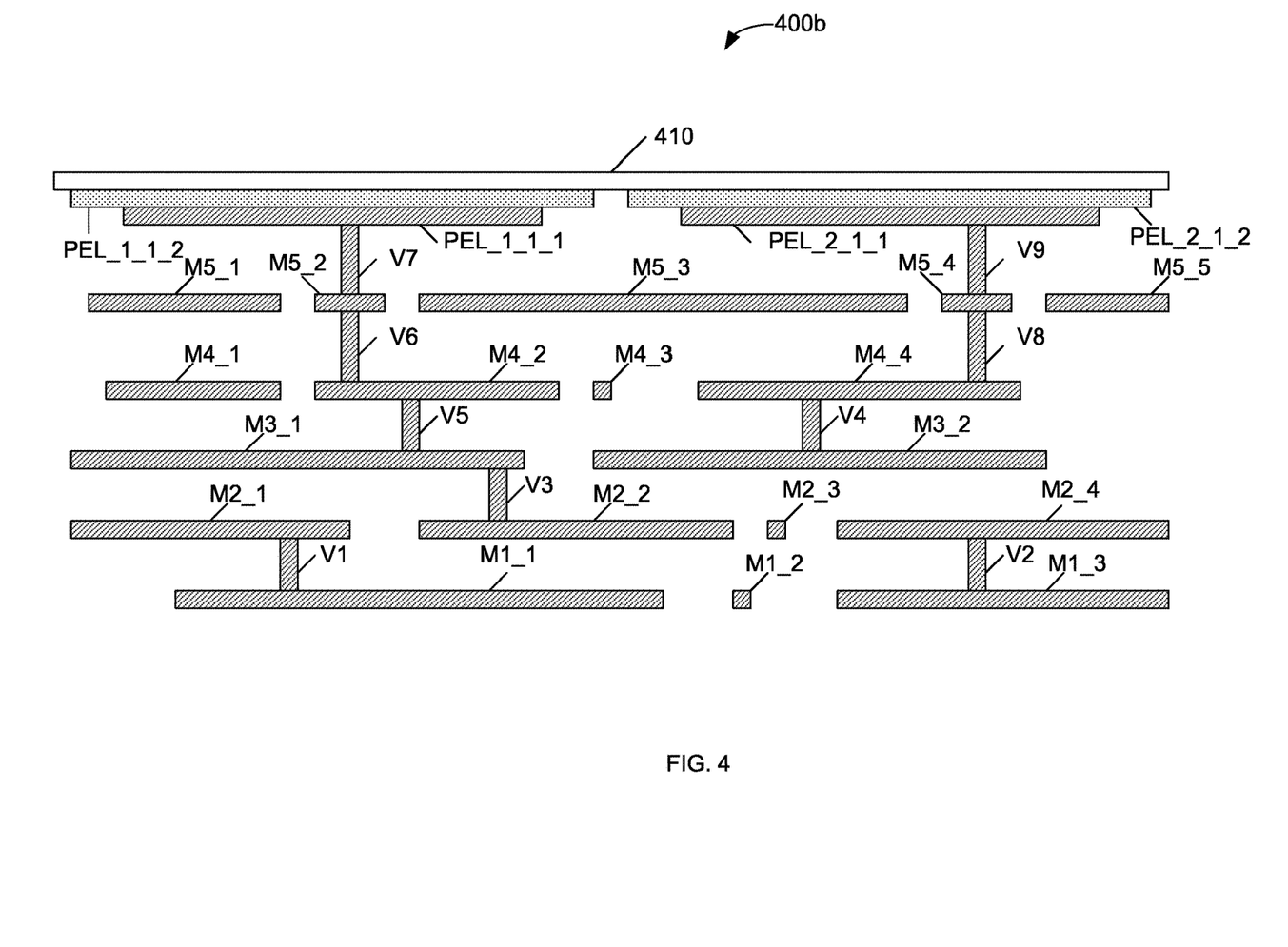
FIG. 4 is an illustration of a portion of a light modulating backplane in accordance with one embodiment of the present invention.

FIG. 4 shows a light modulating backplane 400b that addresses the brightness issues of light modulating backplane 300b in accordance with another embodiment of the present invention. Because light modulating backplane 400b is very similar to light modulating backplane 300b, only the differences between light modulating backplane 400b and light modulating backplane 300b are described. The major difference between light modulating backplane 400b and light modulating backplane 300b is that light modulating backplane 400b uses multilayer pixel electrodes. As shown in FIG. 400b, pixel electrode PE_1_1 includes a first pixel electrode layer PEL_1_1_1 and a second pixel electrode layer PEL_1_1_2 covering first pixel electrode layer PEL_1_1_1. The second pixel electrode layer is the reflective layer of the pixel electrode. Pixel electrode layer PEL_1_1_1 is part of metal layer M6 and made using Copper. However, pixel electrode layer PEL_1_1_2 is made using aluminum. In light modulating backplane 400b, pixel electrode layer PEL_1_1_2 is larger than pixel electrode layer PEL_1_1_1. However, in other embodiments of the present invention the various pixel electrode layers can be the same size and in some embodiments the lower pixel electrode layer (e.g. pixel electrode layer PEL_1_1_1) can be larger than the upper pixel electrode layer (e.g. pixel electrode layer PEL_1_1_2). Similarly, pixel electrode PE_2_1 also includes a first pixel electrode layer PEL_2_1_1 and a second pixel electrode layer PEL_2_1_2 covering first pixel electrode layer PEL_2_1_1.

The upper pixel electrode layers (e.g. pixel electrode layers PEL_1_1_2 and PEL_2_1_2) of the pixel electrodes in light modulating backplane 400b are made using aluminum to provide better reflectivity than the pixel electrodes of light modulating backplane 300b. In addition, using aluminum to cover the copper layer of the pixel electrode greatly reduces the outdiffusion issues of the copper layer. Thus, passivation layer 410 (on the top surface of light modulating backplane 400b) can be thinner than the passivation layer of light modulating backplane 300b.

Light modulating backplane 400b can still be manufactures at most CMOS fabs because most CMOS fabs because light modulating backplane does not require special LCOS vias to interconnect aluminum pixel electrodes to lower level metal layers. Most CMOS fabs are capable of depositing and patterning an aluminum layer near the top of the light modulating backplane. In a particular embodiment of the present invention, pixel electrode layer PE_1_1_1 has a width of 4 micrometers a length of 4 micrometers, and a thickness of 210 nanometers and pixel electrode layer P_1_1_1_2, has a width of 5 micrometers a length of 5 micrometers, and a thickness of 260 nanometers, and passivation layer 410 has a thickness of 75 nanometers.

Figure 5:
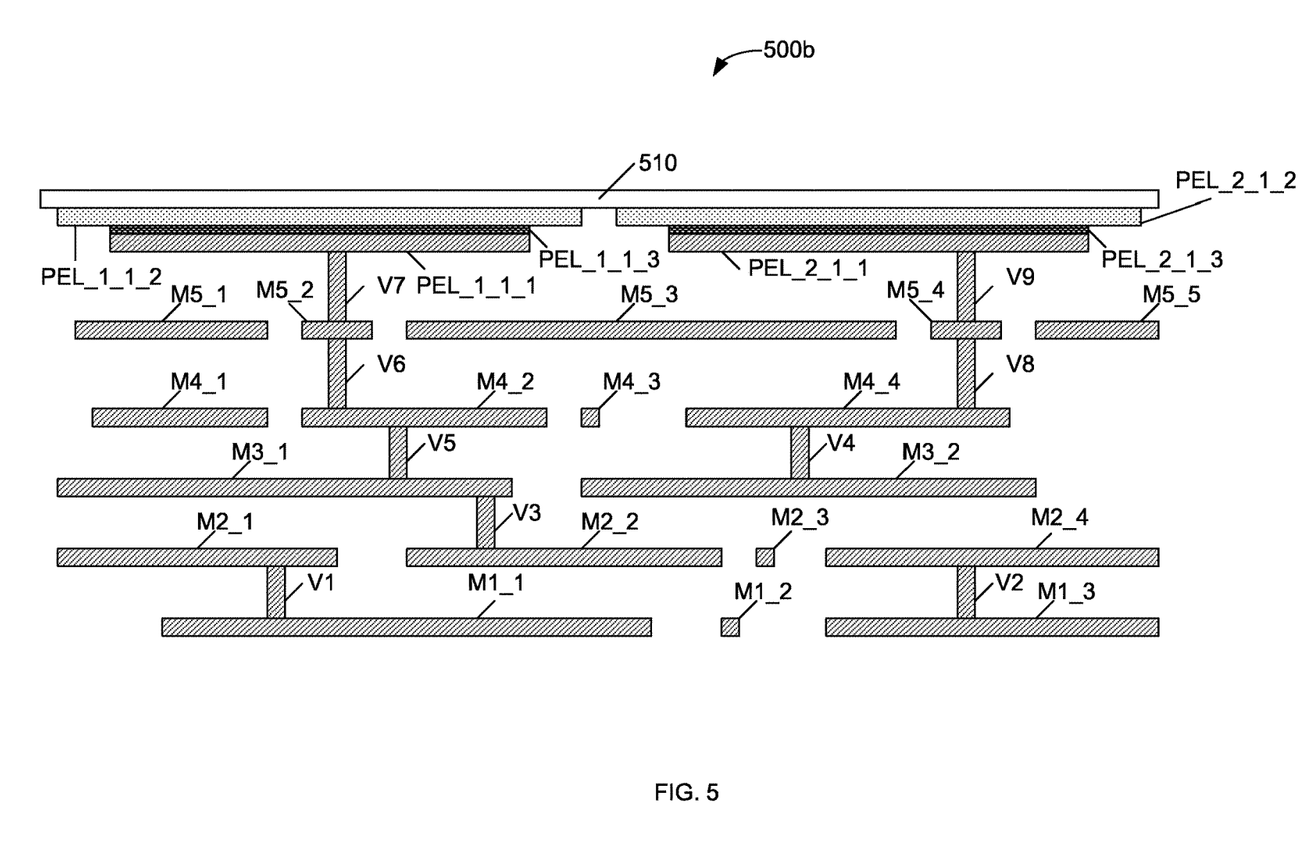
FIG. 5 is an illustration of a portion of a light modulating backplane in accordance with one embodiment of the present invention.

As shown in FIG. 5, some embodiments of the present invention also include a third pixel electrode layer. Specifically, FIG. 5 shows a light modulating backplane 500b. Because light modulating backplane 500b is very similar to light modulating backplane 400b, for brevity, only the differences are described. Specifically, the pixel electrodes of light modulating backplane 500b include a third pixel electrode layer between the first pixel electrode layer and the second pixel electrode layer. The third pixel electrode layer is an adhesion layer that improves the bonding between the first pixel electrode layer and the second pixel electrode layer. The adhesion layer can be formed using Titanium or Titanium Tungsten Alloy. Specifically, as shown in FIG. 5, pixel electrode PE_1_1 includes a first pixel electrode layer PEL_1_1_1, a second pixel electrode layer PEL_1_1_2, and a third pixel electrode layer PE_1_1_3, that is in between first pixel electrode layer PEL_1_1_1 and second pixel electrode layer PE_1_1_3. Similarly, pixel electrode PE_2_1 includes a first pixel electrode layer PEL_2_1_1, a second pixel electrode layer PEL_2_1_2, and a third pixel electrode layer PE_2_1_3, that is in between first pixel electrode layer PEL_2_1_1 and second pixel electrode layer PE_2_1_3. In a particular embodiment of the present invention, pixel electrode layer PE_1_1_1 has a width of 4 micrometers a length of 4 micrometers, and a thickness of 210 nanometers, pixel electrode layer PE_1_1_1_2, has a width of 5 micrometers a length of 5 micrometers, and a thickness of 260 nanometers, and pixel electrode layer PE_1_1_1_3, has a width of 4 micrometers a length of 4 micrometers and a thickness of 10 nanometers. Passivation layer 510 has a thickness of 75 nanometers.

Figure 6:
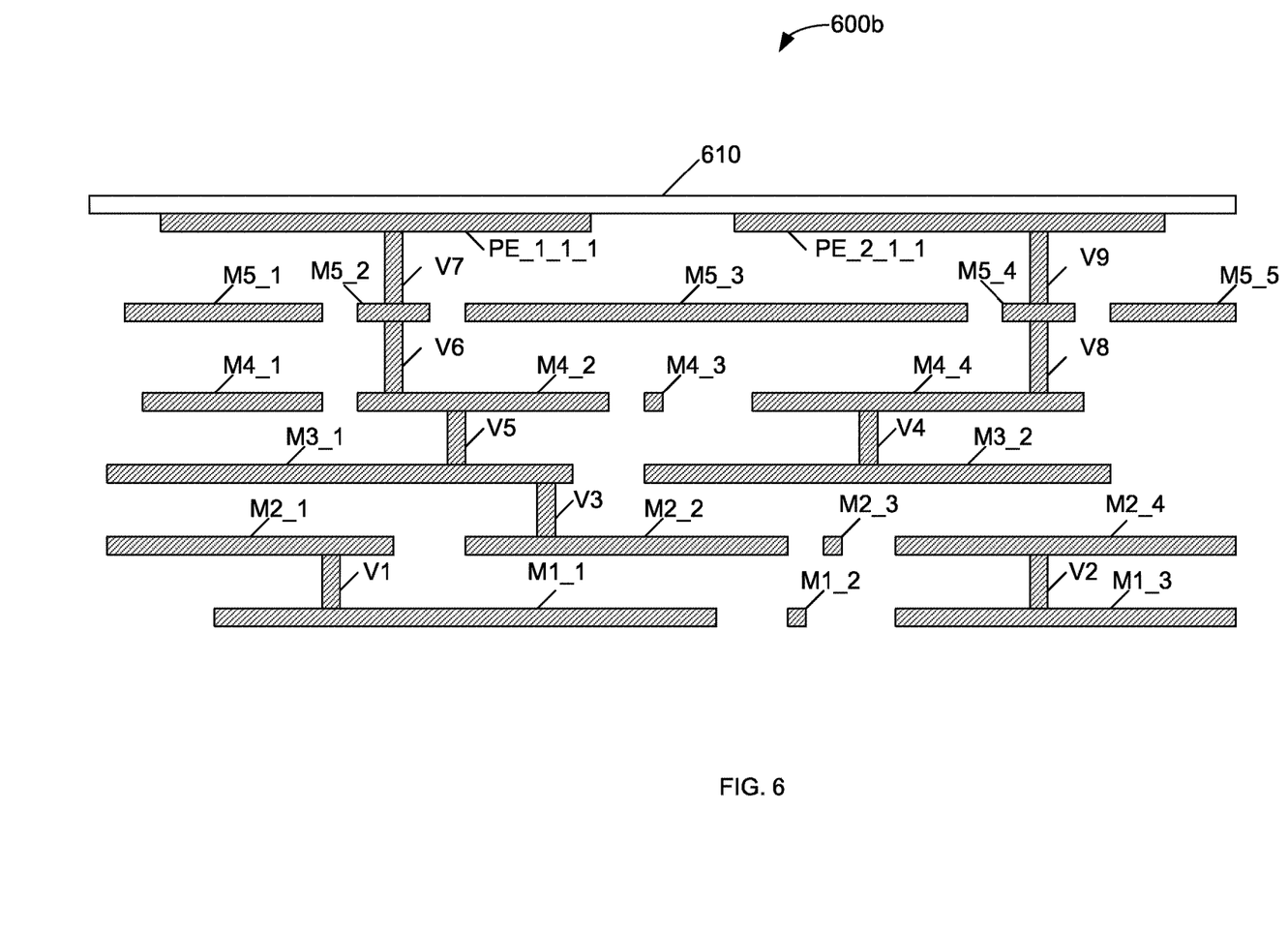
FIG. 6 is an illustration of a portion of a light modulating backplane in accordance with one embodiment of the present invention.

Although most CMOS fabs can manufacture light modulating backplanes 400b and 500b, some fabs may not process both copper and aluminum at a reasonable price. Thus some embodiments of the present invention are first processed at a first fab and then later processed at a second fab to add the second pixel electrode layer. As shown in FIG. 6, after formation of the first pixel electrode layer of a light modulating backplane 600b, a protective layer 610 is used to cover the surface of light modulating backplane 600b at the first fab. Light modulating backplane is then completed at a second Fab which strips protective layer 610 from light modulating backplane 600b prior to formation of the additional pixel electrode layers as shown in FIG. 4 or 5. In a particular embodiment of the present invention protective layer 610 is made using PSG (i.e. Phosphosilicate Glass), which can be easily stripped at the second Fab using a conventional acid rinse. Some Fabs can deposit aluminum layers but cannot properly pattern aluminum. For these fabs, protective layer 610 can be made of Aluminum. In which case the second fab can simply pattern the aluminum protective layer to form the second pixel electrode layer rather than removing protective layer 610.

Figure 7:
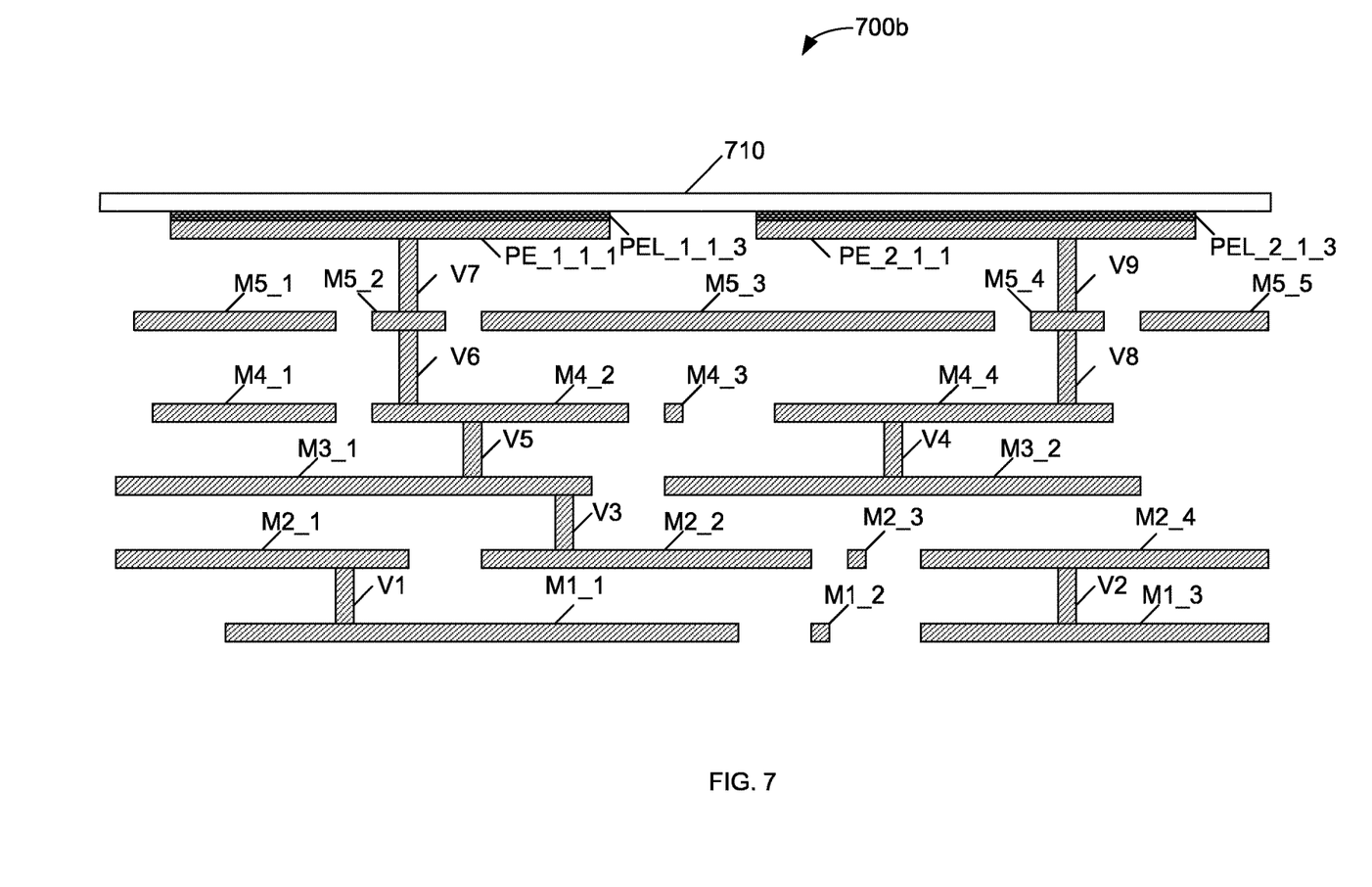
FIG. 7 is an illustration of a portion of a light modulating backplane in accordance with one embodiment of the present invention.

In some embodiments of the present invention, the first fab also fabricates the third pixel electrode layer (i.e. the adhesion layer). Thus, as shown in FIG. 7, prior to creating protective layer 710, the third pixel electrode layer is formed over the first pixel electrode layers. Specifically, pixel electrode layers PEL_1_1_3 is fabricated over pixel electrode layer PEL_1_1_1 and pixel electrode layer PEL_2_1_3 is fabricated over pixel electrode layer PEL_2_1_1.

In the various embodiments of the present invention, novel structures and methods have been described for creating light modulating backplanes. The various embodiments of the structures and methods of this invention that are described above are illustrative only of the principles of this invention and are not intended to limit the scope of the invention to the particular embodiment described. For example, in view of this disclosure those skilled in the art can define other pixel control circuits, pixel electrodes, pixel electrode layers, passivation layers, protective layers, light modulating units, and so forth, and use these alternative features to create a method or system according to the principles of this invention. Thus, the invention is limited only by the following claims.

What is claimed is:

1. A light modulating backplane comprising: a plurality pixel control circuits; a plurality of pixel electrodes, wherein each pixel electrode further comprises: a first pixel electrode layer coupled to a pixel control circuit; and a second pixel electrode layer on top of, of and covering, and directly contacting the first pixel electrode layer, wherein the second pixel electrode layer is coupled to the pixel control circuit; and a passivation layer covering the pixel electrodes, wherein the pixel electrodes further comprise a third pixel electrode layer on top of, covering, and directly contacting the second pixel electrode layer.

2. The light modulating backplane of claim 1, wherein the first pixel electrode layer is formed using a first metal, and wherein the second pixel electrode layer is formed using a second metal.

3. The light modulating backplane of claim 2, wherein the second metal is aluminum.

4. The light modulating backplane of claim 3, wherein the first metal is copper.

5. The light modulating backplane of claim 1 wherein the second pixel electrode layer is an adhesion layer.

6. The light modulating backplane of claim 1 wherein the first pixel electrode layer is formed using a first metal, and wherein the third pixel electrode layer is formed using a second metal.

7. The light modulating backplane of claim 6, wherein the second metal is aluminum.

8. The light modulating backplane of claim 6, wherein the first metal is copper.

9. The light modulating backplane of claim 6 wherein the second pixel electrode layer is formed using Titanium.

10. The light modulating backplane of claim 1, wherein the first pixel electrode layer is formed at a first fab and the second pixel electrode layer is formed at a second fab.

11. The light modulating backplane of claim 1, wherein a third pixel electrode layer is formed on the second pixel electrode layer at the second fab.

12. The light modulating backplane of claim 10, wherein a third pixel electrode layer is formed on the second pixel electrode layer at the second fab.

13. The light modulating backplane of claim 10, wherein a protective layer covering the first pixel electrode layer is formed at the first fab.

14. The light modulating backplane of claim 13 wherein the protective layer is stripped at a second fab before the second pixel electrode layer is formed.

15. The light modulating backplane of claim 1, wherein the first pixel electrode layer is formed at a first fab and the second pixel electrode layer is patterned at a second fab.

16. The light modulating backplane of claim 15, wherein the second pixel electrode layer is deposited at the first fab.

17. The light modulating backplane of claim 1, wherein a protective layer is formed over the first pixel electrode layer at the first fab.

18. The light modulating backplane of claim 17, wherein the protective layer is stripped at the second fab prior to forming the second pixel electrode layer.

19. The light modulating backplane of claim 1, wherein a third pixel electrode layer is formed on the second pixel electrode layer at a second fab.

* * * * *